United States Patent [19]

Justice

[11] Patent Number: 4,809,421
[45] Date of Patent: Mar. 7, 1989

[54] SLOTTED SHIM
[75] Inventor: Richard S. Justice, St. Charles, Ill.
[73] Assignee: Precision Brand Products, Inc., Downers Grove, Ill.
[21] Appl. No.: 868,175
[22] Filed: May 22, 1986

Related U.S. Application Data

[63] Continuation of Ser. No. 570,754, Jan. 16, 1984, abandoned.

[51] Int. Cl.$^4$ .................. B23P 19/00; F16M 1/00; F16B 43/02
[52] U.S. Cl. .................. 29/525.1; 411/539; 248/678; 248/188.2
[58] Field of Search .................. 411/522–529, 411/535–539, 546, 461; 308/244; D8/354; 403/408.1; 248/678, 677, 188.2; 384/626; 29/526 R

[56] References Cited

U.S. PATENT DOCUMENTS

| | | | |
|---|---|---|---|
| D. 246,346 | 11/1977 | Strunk . | |
| 1,999,868 | 4/1935 | Coultas | 308/244 |
| 2,383,135 | 8/1945 | Lang | 411/461 |
| 2,417,423 | 3/1947 | Lang | 411/461 |
| 2,431,342 | 11/1947 | Perkins . | |
| 3,154,826 | 11/1964 | Flora | 411/523 |
| 3,315,923 | 4/1967 | Young | 248/677 |
| 3,346,286 | 10/1967 | Wescott | 403/408 |

FOREIGN PATENT DOCUMENTS 2078328  1/1982  United Kingdom .............. 308/244

OTHER PUBLICATIONS

Two publications of Quik-Shim Systems, including a price list effective 1/1/82 and a sheet entitled "Why Quik-Shim stacks up to give you the best design & value in a precut shim system."
Handbook of Small Standardized Components, Master Catalog 757, copyright 1982 by Stock Drive Products Division of Designatronics, Inc., New Hyde Park, NY, p. 668.
Undated 1-page publications of Lawton Industries, Inc., entitled "Shims" and D.D. Motor Shims, respectively.
Publications of Aloma Manufacturing & Sales, Inc., including price list dated Mar. 1, 1982, drawings of shims Athrough D, Sheet entitled "Save Money--Protect Equipment-Increase Safety" and two-page brochure entitled Pre-Cut Shims.
Service Manual for a 1981 Camaro, pp. 3A-1, 3A-2, 3A-3, 3A-4, 3C-1, 3C-2, 3C-11, 3C-12.
1980 Chevrolet Service Manual, cover, foreward, and pp. 3A-1, 3A-2, 3A-3, 3C-1.
1977 Buick Service Manual, cover, foreward, and pp. 3A-1, 3A-2, 3A-3, 3C-19.
Au-ve-co 1973-74 Catalog, cover and pp. 76, 77 and 78 by Auto Vehicle Parts Co., Newport, Ky.

Primary Examiner—Neill Wilson
Attorney, Agent, or Firm—Gerlach & O'Brien

[57] ABSTRACT

A shim for insertion between the base of a machine and a support for the machine to adjust the spacing therebetween, which machine and support are secured together by bolt means extending between the base and the support, includes a body portion and a pair of leg portions integral with the body portion and extending forwardly therefrom to a front end of the shim. The leg portions define between them a bolt-means receiving slot extending rearwardly from the front end of the shim. Each of the leg portions has a front edge at the front end of the shim, which is inclined inwardly toward the slot and rearwardly. When the shim is inserted between a machine base and a support, and advanced toward bolt means extending therebetween, engagement of either one of the front edges of the leg portions with the bolt means causes the shim to move into a position of alignment of the slot and the bolt means for reception of the bolt means in the slot. Preferred shim structures also include a portion of portions integral with the body portion and extending rearwardly therefrom to the rear end of the shim, for gripping and other purposes.

1 Claim, 1 Drawing Sheet

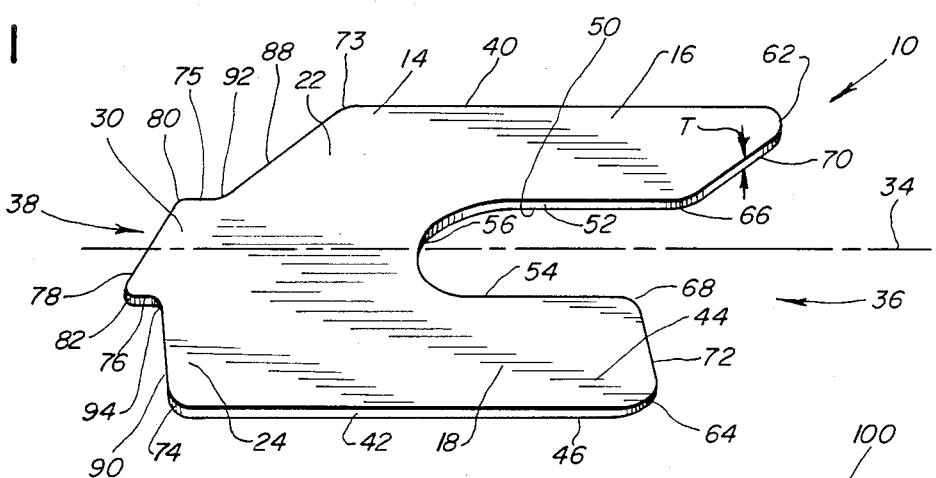
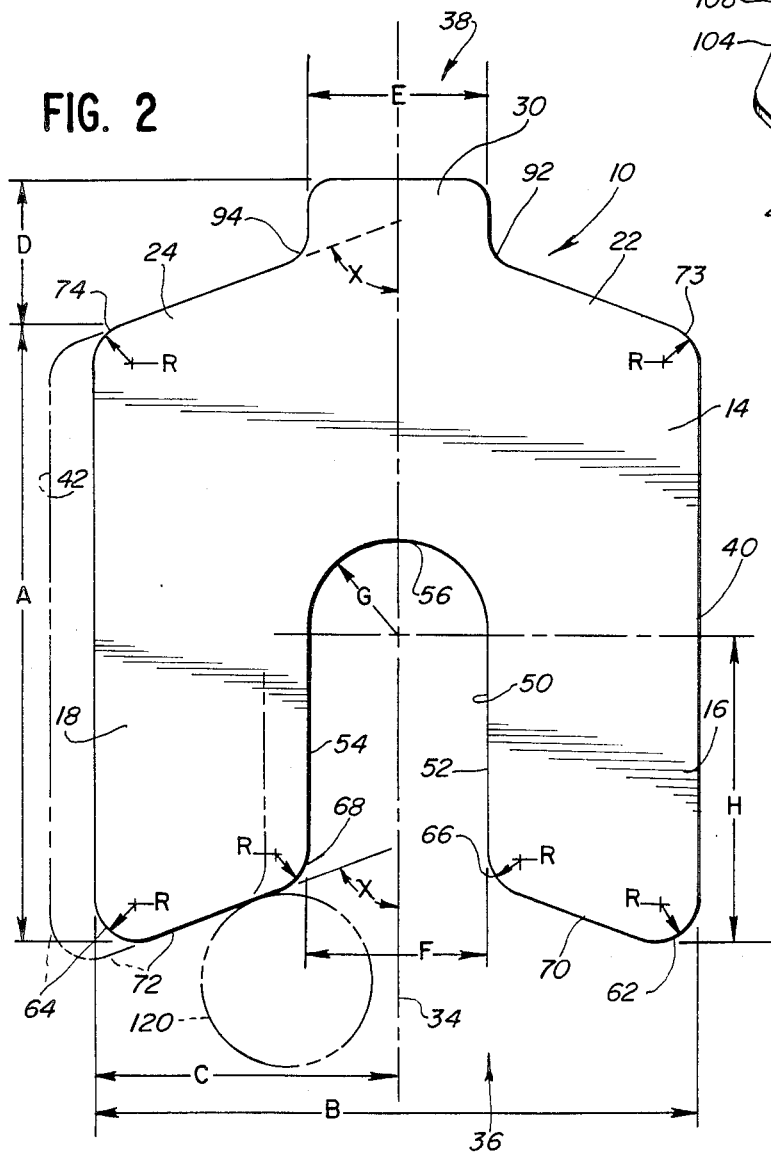
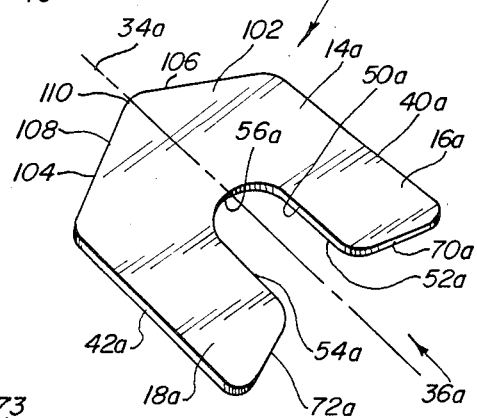
FIG. 1
FIG. 2
FIG. 3
FIG. 4

SLOTTED SHIM

This is a continuation of co-pending application Ser. No. 570,754, filed on Jan. 16, 1984, now abandoned.

BACKGROUND OF THE INVENTION

This invention relates to shims for machinery, more specifically to a slotted shim for spacing apart a machine base and a support for the machine, and adapted to receive in its slot machine-securing bolt means extending between the base and the support.

In installing or maintaining machinery such, for example, as motors, pumps, turbines, compressors, die stampers, punch presses, gear boxes and journal boxes, it often is necessary precisely to align or level one machine with respect to another machine or equipment which is coupled thereto or otherwise cooperates therewith, or to align different components of the same machine with respect to each other, for proper operation. Thus, for example, when a motor directly drives a pump, efficient performance of the combination is aided by having the shafts of the motor and pump in axial alignment.

Machines commonly are mounted on supports therefor by releasably securing the bases of the machines to the supports by bolt means, including bolts, studs, and other rod-like connectors, having elongate shanks or the like which extend between the bases and their supports. Approximate alignment or leveling of a machine is accomplished by appropriate positioning or placement of its support. Precise alignment then is attained by inserting one or more shims between the machine base and its support, to adjust the spacing therebetween.

In order to preserve an alignment obtained by shimming and to minimize unwanted movement, it is desirable that a shim or shims support or cover a maximum proportion of the supported surface or surfaces of the machine base. When a bolt means extends through such a surface to connect the machine to its support, maximum shim support is provided by inserting a plurality of shims around the bolt means, or by inserting a shim or shims having a bolt means-receiving slot or hole therein. Slotted shims are preferred for insertion between a machine base and a support without need to remove one from the other, while minimizing the number of shims and attendant labor.

Shims may be custom-made, as needed for a job, by hand-cutting pieces from commercially available shim stock of predetermined thickness. However, hand-cutting can result in the formation of burrs that are hazardous to the user. Hand-cut shims may be relatively expensive, particularly when they are made on the job by high-priced labor performing machine-setup work. Also, there is wastage of the shim stock.

Shims which are pre-cut in standard shim and slot sizes are available commercially. While they obviate the foregoing disadvantages of custom-made shims, the pre-cut shims, as well as the custom-made shims, may be damaged in use, particularly during insertion between the machine base and its support.

Shimming a machine to effect the final adjustment of its position relative to its support often is carried out with the machine set on its support and its securing bolt means in place, but not tightened. Frequently, the medial portion of the bolt means, between the base of the machine and the support, is hidden from view by machine and support structure. Consequently, when a slotted shim is inserted between the base and the support at a bolt means location, it may be necessary to feel about blindly with the front end of the shim, to align the shim slot with the bolt means. During such an insertion, the shim, particularly one having a thin gauge, may be bent by snagging its front end on the bolt means, so that it must be discarded. The time required to insert the shim properly also may increase, with a resultant increase in labor cost.

SUMMARY OF THE INVENTION

The present invention provides a slotted shim that overcomes the disadvantages of the prior art and provides improvements thereover. In particular, a novel shim is provided that is constructed to facilitate and expedite its insertion between a machine base and a support for the machine, in the case where the machine is secured to the support by bolt means extending from the base to the support. Structure is provided which serves to direct and guide the shim into a position of alignment of its slot with the bolt means, so that the bolt means may be received in the slot as the shim is inserted, without catching or snagging on the bolt means with resulting damage to the shim. The new structure is especially advantageous in the very thin shim thicknesses, down to one-thousandths of an inch, where the shims are very fragile and easily damaged, to the point where they are rendered useless or defective in use.

The shim of the invention is further constructed for increased strength, rigidity and durability, while affording larger and more convenient gripping areas for manual handling. The improvements are provided without significant increase in material requirements or manufacturing cost.

More particularly, the invention provides a shim which includes a body portion, a pair of leg portions integral with the body portion and extending forwardly therefrom to a front end of the shim, such leg portions defining between them a bolt means-receiving slot extending rearwardly from the front end of the shim, and a front edge on each of the leg portions at the front end of the shim and inclined inwardly towards the slot and rearwardly, whereby upon insertion of the shim between the base of a machine and a support for the machine, engagement of either one of the front edges with a bolt means causes the shim to move into a position of alignment of the slot and the bolt means for reception of the bolt means in the slot.

Preferred embodiments include a gripping portion integral with the body portion and extending rearwardly therefrom to the rear end of the shim. It is further preferred that the gripping portion include shoulder portions having rearwardly convergent inclined rear edges. In still further preferred structures, the gripping portion also includes a gripping tab portion integral with the body portion and with the gripping shoulder portions, and extending rearwardly beyond the shoulder portions.

BRIEF DESCRIPTION OF THE DRAWINGS

The attached drawings illustrate preferred embodiments of the invention, without limitation thereto. In the drawings, like elements are identified by like reference symbols in each of the views, and:

FIG. 1 is a perspective view of a shim in accordance with the invention;

FIG. 2 is an enlarged plan view of the shim of FIG. 1, illustrating in phantom lines a shift in the position of the shim, relative to a bolt means;

FIG. 3 is a perspective view of another embodiment of the shim of the invention; and FIG. 4 is a fragmentary perspective view of a motor base and a support therefor, showing the shim illustrated in FIGS. 1 and 2 inserted therebetween in accordance with the invention.

DESCRIPTION OF THE PREFERRED EMBODIMENTS

Referring particularly to FIGS. 1 and 2 of the drawings, a preferred shim 10 in accordance with the invention is a one-piece integral structure of a generally rectangular central body portion 14, a pair of leg portions 16 and 18 extending from one end of the body portion, a pair of gripping shoulder portions 22 and 24 extending from the opposite end of the body portion, and a gripping tab portion 30 extending from the opposite end of the body portion and from the shoulder portions.

The shim 10 has a longitudinal axis 34 and extends longitudinally between shim front and rear ends 36 and 38, respectively. The shim 10 is bordered by longitudinally extending opposite outer side edges 40 and 42, which are substantially parallel to the axis 34 and to each other. The shim 10 has opposite substantially flat or planar and parallel supporting surfaces 44 and 46, which are spaced apart a distance T (FIG. 1), constituting the uniform thickness of the shim.

The leg portions 16 and 18 extend forwardly from the body portion 14 to the front end 36 of the shim, and they define between them a centrally-located bolt means-receiving slot 50, which extends rearwardly from the front end 36, for the length of the leg portions. The slot 50 is defined by a pair of longitudinally extending spaced apart inner side edges 52 and 54 of the leg portions, which edges are integrally joined together by a substantially semi-circular concave rear edge 56 common to the leg portions. The inner side edges 52 and 54 are substantially parallel to the axis 34, to each other, and to the outer side edges 40 and 42. The inner side edges 52 and 54 are equidistantly spaced from the axis 34.

The forwardly disposed portions of the outer side edges 40 and 42 of the shim constitute outer side edges of the leg portions 16 and 18, respectively, and they terminate at respective front end outer corners 62 and 64, having convexly curved edges merging therewith. The inner side edges 52 and 54 of the leg portions 16 and 18 terminate at respective front end inner corners 66 and 68, having convexly curved edges merging therewith. The leg portions 16 and 18 have rectilinear front edges 70 and 72 at the front end 36 of the shim, which edges extend substantially from the outer corners 62 and 64, to the inner corners 66 and 68, respectively, and merge with the outer and inner corner edges. The front edges 70 and 72 are inclined inwardly towards the slot 50 and rearwardly. The rearwardly disposed portions of the outer side edges 40 and 42 of the shim constitute outer side edges of the body portion 14, and they terminate at respective rear end outer corners 73 and 74, having convexly curved edges merging therewith. The front end outer corners 62 and 64, and the rear end outer corners 73 and 74 substantially comprise the corners of a rectangle, which encompasses the body portion 14 and the leg portions 16 and 18.

The gripping tab portion 30 is generally rectangular, and is centrally or axially disposed in the shim 10, having longitudinally extending outer side edges 75 and 76 in equidistantly spaced substantially parallel relation to the longitudinal axis 34. The tab portion 30 has a transversely extending rear edge 78, which is integrally and continuously joined to the side edges 75 and 76 of the tab portion by convexly curved edges of rear end outer corners 80 and 82, respectively.

The gripping shoulder portions 22 and 24 are generally triangular, and have rectilinear rear edges 88 and 90, respectively, that extend inwardly from the rear end corners 73 and 74 to the tab portion 30, and are inclined convergently from the body portion 14 to the tab portion 30. The rear edges 88 and 90 merge with the edges of the rear end corners 73 and 74, and are joined to the side edges 75 and 76 of the tab portion 30 by concave edges on neck portions 92 and 94. The rear edges 88 and 90 of the gripping shoulder portions 22 and 24 are substantially parallel to the front edges 70 and 72 of the leg portions 16 and 18, respectively, in the illustrative embodiment.

The shim 10 is made in a series of sizes, having slots 50 corresponding to the sizes of bolt means, such as bolts, studs, and the like, commonly used for mounting machinery, particularly, AC and DC motors, pumps, turbines, compressors, die stampers, punch presses, gear boxes, journal blocks, and other machinery. The slot 50 is made slightly wider than the diameter of the bolt means to be received therein, e.g., 1/16th inch wider than the prescribed bolt means size. Ordinarily, it is preferred to use a matching shim size for each bolt means, to provide maximum bearing support for the machinery, but a shim may be used with a smaller size of bolt means than that prescribed for the shim.

Exemplary shim sizes, in inches, are 2×2, 3×3, 4×4, and 5×5, corresponding to the dimensions A and B illustrated in FIG. 2, representing the combined length of the body portion 14 and a leg portion 16 or 18, and the width of the shim 10, respectively. The slot widths F, illustrated in FIG. 2, which correspond to the foregoing shim sizes, preferably are 9/16", 11/16", 19/16", and 25/16", respectively. Each of the shim sizes is provided in a preferred thickness range of from 0.001 inch to 0.125 inch.

The dimensions of the body portion 14 and the leg portions 16 and 18 are selected so that, preferably, such portions are received between a machine base and its support, without protruding from the machine. At the same time, it is preferred that the body and leg portions 14, 16 and 18 cover a maximum amount of the undersurface of the machine base, around the connecting bolt means, which is to be supported positively by the machine support. It will be understood that there will be variations from the optimum area covered by the shim 10 as it is employed with different machinery. The exemplary sizes and dimensions disclosed herein for the illustrative preferred embodiment have been selected for use with base-mounted motors having standardized motor dimensions as established and published by the National Electrical Manufacturers Association.

The shoulder portions 22 and 24, and the tab portion 30 are employed for manual gripping and alignment purposes, thus enabling a user to rapidly and accurately install a shim. Consequently, the shoulder and tab portions will protrude when the shim is in place and ordinarily will not support the machinery.

In the illustrative embodiment, each of the front edges 70 and 72, and the rear edges 88 and 90 is inclined towards the longitudinal axis 34 and rearwardly at an angle to the axis of approximately 70 degrees, as represented in FIG. 2 by the angle x. TABLE I gives the dimensions for the illustrative shim 10 having a size of 2×2, with reference to the letters representing dimensions in FIG. 2.

TABLE I

| Dimension | Inches |
|---|---|
| A | 2 |
| B | 2 |
| C | 1 |
| D | 17/32 |
| E | 9/16 |
| F | 9/16 |
| G | 9/32 |
| H | 1 |
| R | ⅛ |

A shim having the dimensions of TABLE I is intended for use when the diameter of the bolt means is up to about ½ inch, which provides about 1/16 inch of clearance space in the slot 50 beyond the maximum bolt means diameter. Each of the dimensions increases correspondingly with increasing shim size.

The material of construction of a shim made in accordance with the invention preferably is carbon steel or brass, or other suitable metal, and more preferably is a stainless steel of the 300 series of alloys, preferably No. 304 alloy. Shims readily are fabricated by conventional methods, such as die stamping from a strip or sheet of metal having a predetermined thickness. Edges are smoothed by tumbling with abrasive, when greater than 0.01 inch in thickness, and by pinching between two rollers, when 0.01 inch or less in thickness.

A shim 100 is illustrated in FIG. 3, which constitutes a modification of the embodiment of FIGS. 1 and 2. Accordingly, certain elements of the embodiment of FIG. 3, common to both embodiments, are identified by the same reference numerals applied to like elements in the shim 10 of FIGS. 1 and 2, with the addition of the letter "a." Thus, the second embodiment 100 includes a body portion 14a, and leg portions 16a and 18a defining between them a bolt means-receiving slot 50a. The leg portions have respective front edges 70a and 72a, and inner side edges 52a and 54a. The inner side edges terminate in a rear edge 56a. The shim has outer side edges 40a and 42a. The front end of the shim 100 is identified as 36a.

The second shim embodiment 100 differs from the first embodiment 10 in the omission of the tab portion 30 of the latter, and the provision of shoulder portions 102 and 104 which extend to the longitudinal axis 34a. The shoulder portions 102 and 104 have rear edges 106 and 108, respectively, which are inclined rearwardly from the body portion 14a substantially to the axis 34a. The inclined edges 106 and 108 are integrally joined together at the axis by the curved edge of a rearmost central corner 110.

Referring to FIGS. 1, 2 and 4, the shim 10 may be inserted manually between a motor base 114 and a motor support or mount 116 at one of the corners of the base, for motor alignment purposes. A conventional base 114 may be generally rectangular and have a bolt hole 118 extending through it at each corner, for receiving the shank 120 of a bolt or stud 122 or the like therethrough. The bolt or stud 122 may be fixedly secured or otherwise connected to the support 116, and the base 114 is adjustably connected or secured to the support by means of a nut 124 in threaded engagement with a threaded outer end of the bolt or stud 122.

In order to insert a shim 10, it is necessary to make room for the shim, by separating the motor base 114 from the support 116 in some manner, such as by prying the two apart. A shim 10 then is grasped by its tab portion 30 and/or its shoulder portions 22 and 24. The shim is manually inserted generally in its longitudinal direction, with its front end 36 inserted first and its slot 50 in approximate alignment with the shank 120. The ability to align the slot 50 with such shank varies with the construction of the machinery. The shank may be difficult to perceive, if it can be seen, and the ability to determine its position based on outside indications will vary. Accordingly, the shim is moved forwardly either until a leg portion 16 or 18 contacts the bolt shank 120, or the shank is received in the slot 50, permitting full insertion of the shim.

When contact is made between one of the inclined front edges 70 and 72 of the leg portions 16 and 18, and the shank 120, as illustrated in one example in FIG. 2, the shim is caused to move into a position of alignment of the slot 50 and the shank 120, as insertion of the shim continues. Thus, the shim is moved in the direction of its longitudinal axis 34, while a front edge 70 or 72 is in contact with the stationary bolt shank 120, whereby the reaction to the force of insertion causes the shim to move laterally as well as longitudinally, in a camming action. Such movement is illustrated by the phantom lines representing one front edge 72 and one outer side edge 42 in FIG. 2, wherein the shim moves to the left and forwardly, as illustrated in that view. The shim moves to a position in which the bolt shank 120 is at the mouth of the slot 50 and the slot and shank are aligned, following which the shim receives the bolt shank in the slot 50 as insertion continues.

Depending upon the structure of the machine base, the shim 10 may be inserted until the bolt shank 120 abuts on the rear edge 56 bounding the slot, or the insertion may stop short of such abutment. When insertion is complete, the body portion 14 and the leg portions 16 and 18 are disposed between the base 114 and the support 116, and the shoulder portions 22 and 24, and the tab portion 30 protrude or project from the base 114, as illustrated in FIG. 4. When the base 114 is allowed to settle on the shim, it is supported by the body portion 14 and the leg portions 16 and 18 of the shim, and is spaced apart from the support 116 by a distance substantially equal to the thickness of the shim. The nut 124 may be tightened, to secure the machine to the support, in a desired alignment of the machine.

Additional shims may be inserted, or a shim or shims of other thicknesses may be employed, as required. The same procedure may be followed at one or more of the corners of the base 114, as required.

The self-alignment feature of the shim, provided by the inclined front edges 70 and 72 cooperating with the inner side edges 52 and 54 of the slot 50, enables insertion of the shim rapidly and reliably, without damage due to the application of force when the shim is inserted out of alignment initially. The shoulder portions 22 and 24 cooperate in increasing the rigidity and strength of the shim, as well as providing for a better and more widely distributed hold by the user, while the amount of material protruding from the machinery is kept to a minimum. The tab portion 30, adding to the length of the gripping portions, is reinforced and held more rigidly by the integral shoulder portions 22 and 24. In this connection, it is possible to employ the tab portion 30 alone, without the shoulder portions 22 and 24, while maintaining the self-alignment feature. However, the additional advantages provided by the shoulder portions may be had without additional cost of material. Thus, a plurality of shims may be cut from a sheet of material with the shims as they are to be cut generally in alignment and the front edges 70 and 72 of one shim substantially parallel and adjacent to the rear edges 88 and 90 of an adjacent shim, whereby material left between the leg portions provides for the formation of the shoulder portions. In this connection, it is preferred that when the shims are die-cut from a sheet, they be cut in spaced apart relation to each other, to allow for any relative shifting between the die and the sheet.

The curved or rounded edges of the outer corners 62, 64, 80, 82, 84 and 86, and of the inner corners 66 and 68 eliminate sharp corners, which might cause injury to the hand. The curved edges of the inner corners 66 and 68 also provide for ease and smoothness of movement of the leg portions 16 and 18 over the bolt shank 120, as the latter is received in the slot 50.

The second shim embodiment 100 of FIG. 3 is used in the same manner as the embodiment of FIGS. 1 and 2. The second embodiment includes no tab portion, which is replaced in part by additional area of the shoulder portions 102 and 104. The second embodiment protrudes from the machinery to a lesser extent and reduces wastage of sheet material, while the shoulder portions 102 and 104 otherwise function and afford the advantages described above with reference to the shoulder portions 22 and 24 of the first embodiment.

While preferred embodiments of the invention have been described and illustrated, it will be apparent to those skilled in the art that various changes and modifications may be made therein within the spirit and scope of the invention. It is intended that such changes and modifications be included within the scope of the appended claims.

I claim:

1. A method of adjusting the spacing between the base of a machine and a support for the machine, which machine and support are secured together by bolt means extending between the base and the support, said method comprising the steps of:
    (a) providing a shim having front and rear ends and which comprises
        (1) a body portion,
        (2) a gripping tab portion integral with and extending rearwardly from said body portion centrally thereof,
        (3) a pair of gripping shoulder portions integral with and extending rearwardly from said body portion, said shoulder portions being integral with said tab portion on opposite sides thereof and having rear edges inclined convergently from said body portion to said tab portion, said shoulder and tab portions extending to the rear end of the shim, and said tab portion extending rearwardly beyond said shoulder portions,
        (4) a pair of leg portions integral with said body portion and extending forwardly therefrom to the front end of the shim, said leg portions defining between them a bolt means-receiving slot extending rearwardly from the front end of the shim, and
        (5) a front edge on each of said leg portions at the front end of the shim and inclined inwardly towards said slot and rearwardly;
    (b) manually gripping said gripping tab portion and said gripping shoulder portions for inserting said shim between said machine base and said support with said front end of the shim being inserted first;
    (c) inserting said shim between said machine base and said support for reception of said bolt means in said slot, said front edges each acting upon its engagement with said bolt means to cause the shim to move into a position of alignment of the slot and the bolt means for such reception;
    (d) continuing to insert said shim between said machine base and said support while such reception of the bolt means in the slot continues and until said leg portions and said body portion are disposed between the machine base and the support while the manually gripped tab and shoulder portions protrude from the machine base; and
    (e) allowing said machine base to settle on the shim, supported by said leg and body portions while said tab and shoulder portions protrude from the machine base.

* * * * *